Figure 1:
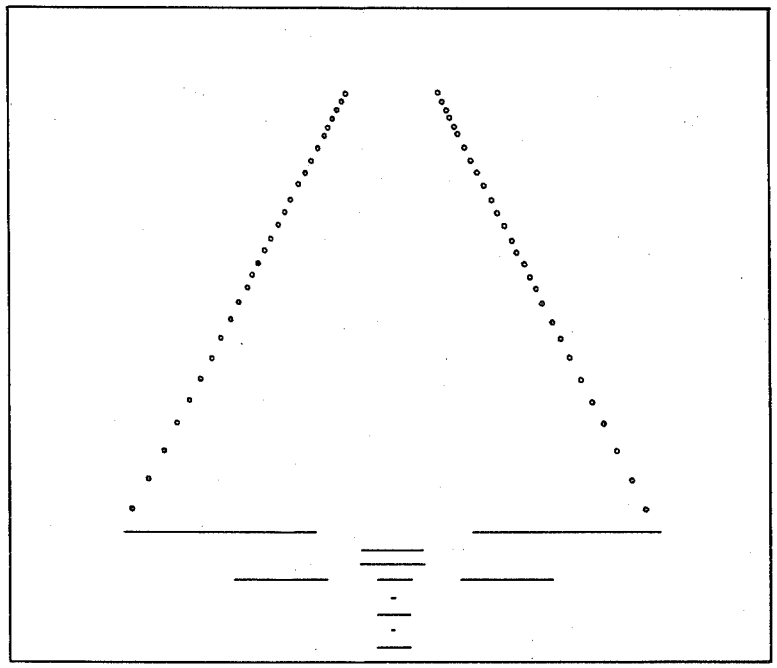

VISUAL PRESENTATION

DEFINING GEOMETRY

JOHN R. MAILHOT
INVENTOR

JOHN R. MAILHOT
INVENTOR

March 19, 1963  J. R. MAILHOT  3,081,557
ABSTRACT VISUAL DISPLAY SYSTEM
Filed April 6, 1960  7 Sheets-Sheet 3
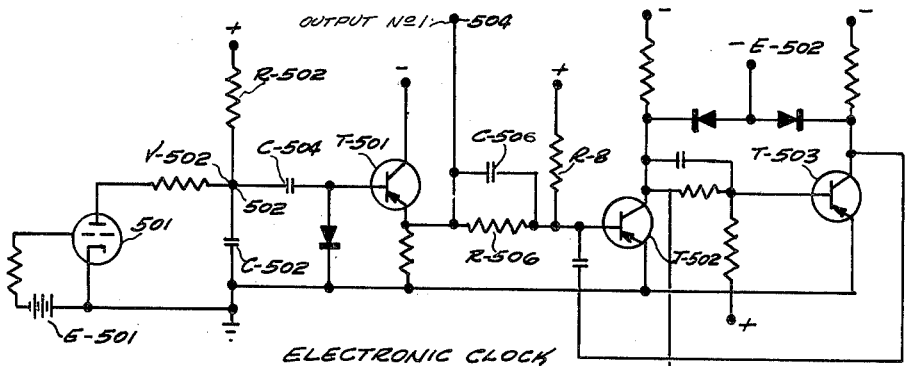
ELECTRONIC CLOCK
FIG. 5A
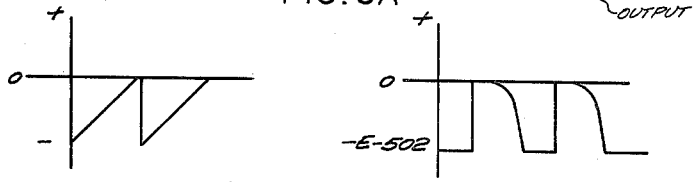
OUTPUT No. 1
FIG. 5B
OUTPUT No. 2
FIG. 5C
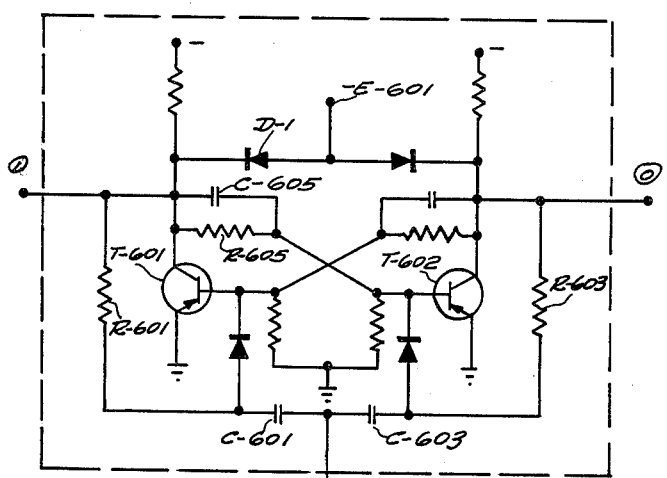
BINARY COUNTER STAGE
FIG. 6A
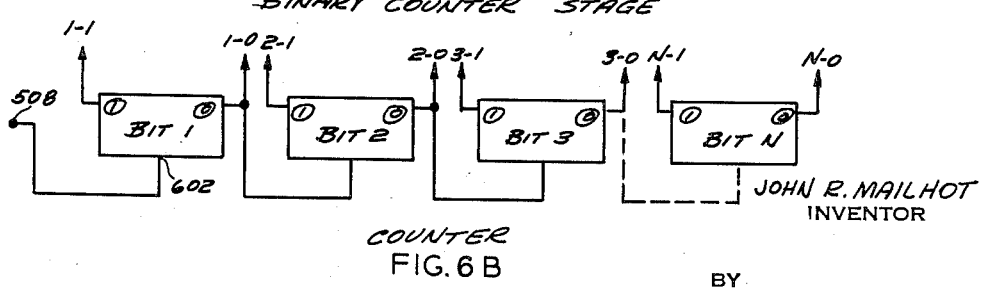
COUNTER
FIG. 6B
JOHN R. MAILHOT
INVENTOR
BY
ATTORNEY

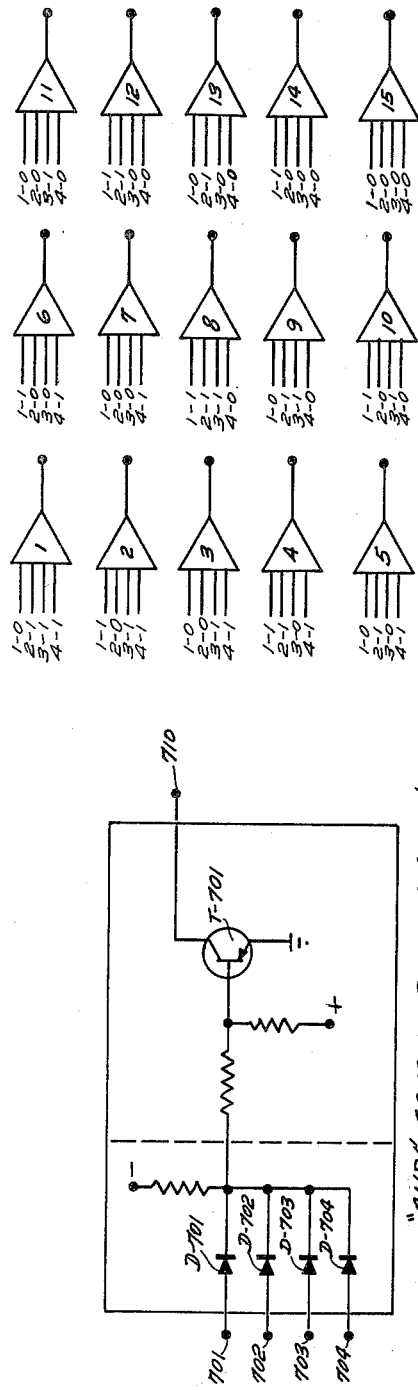
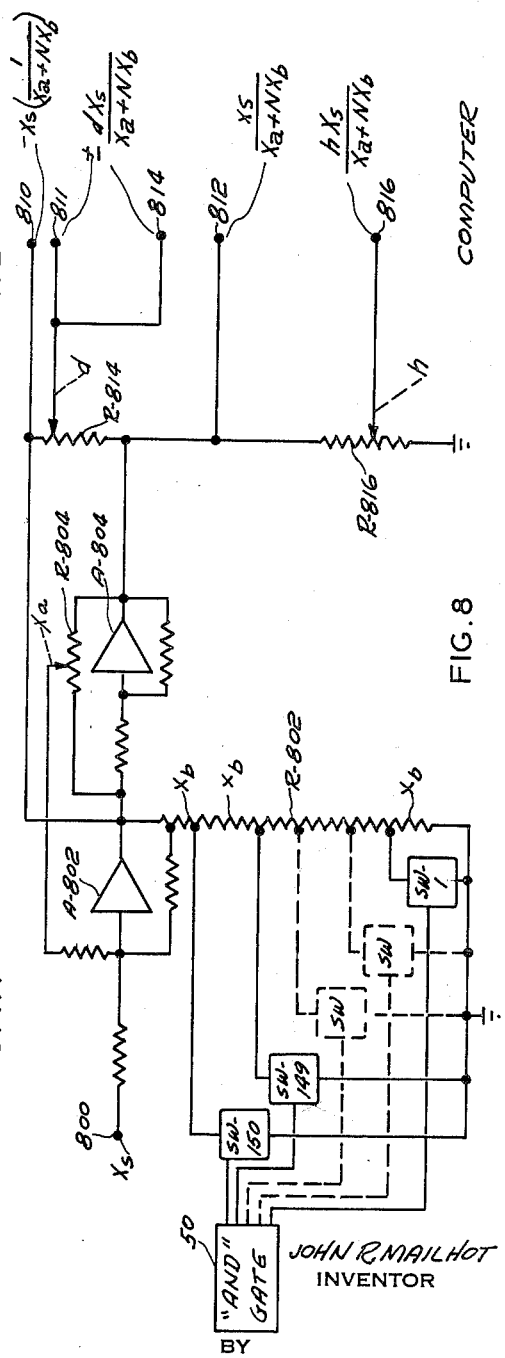

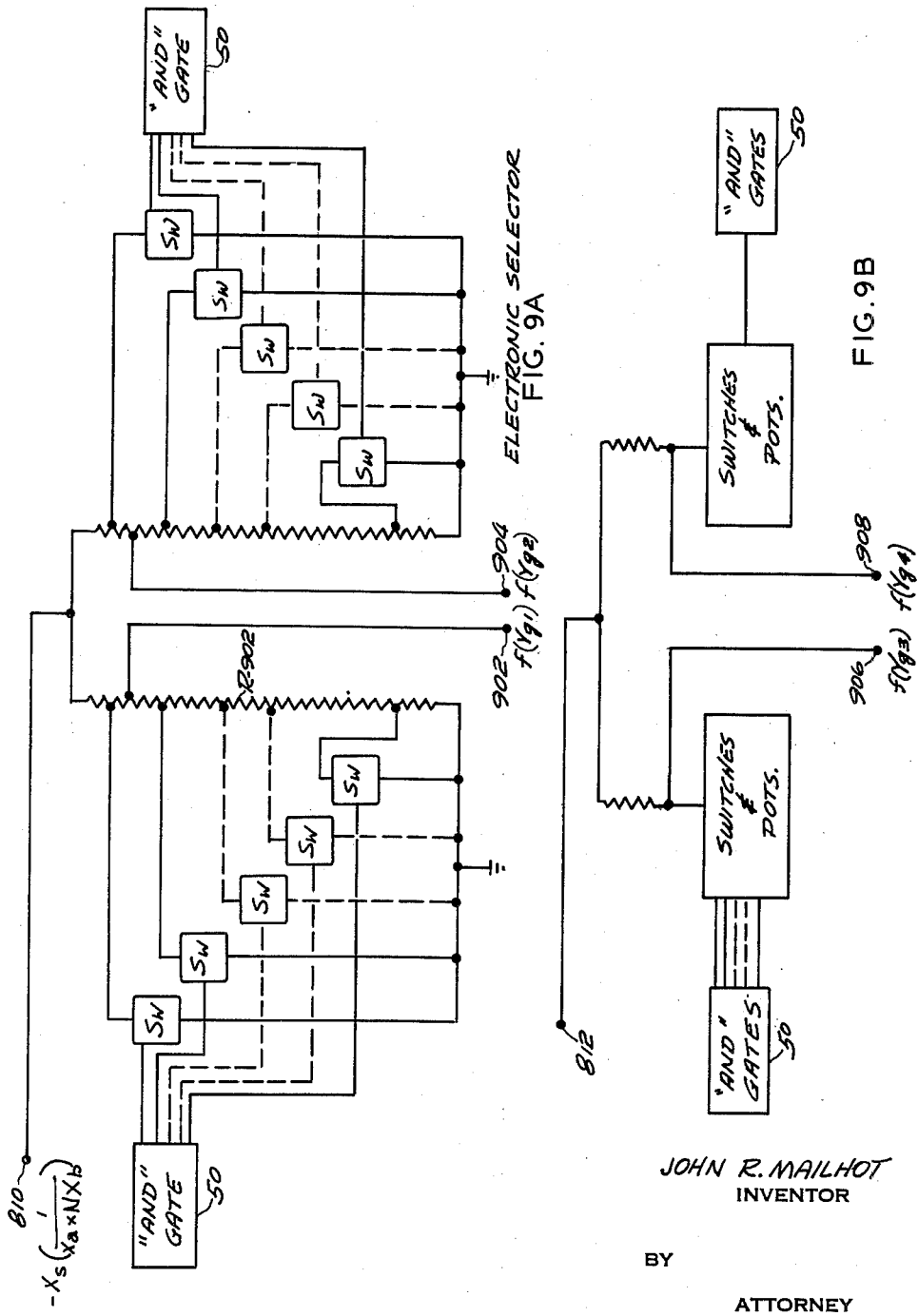

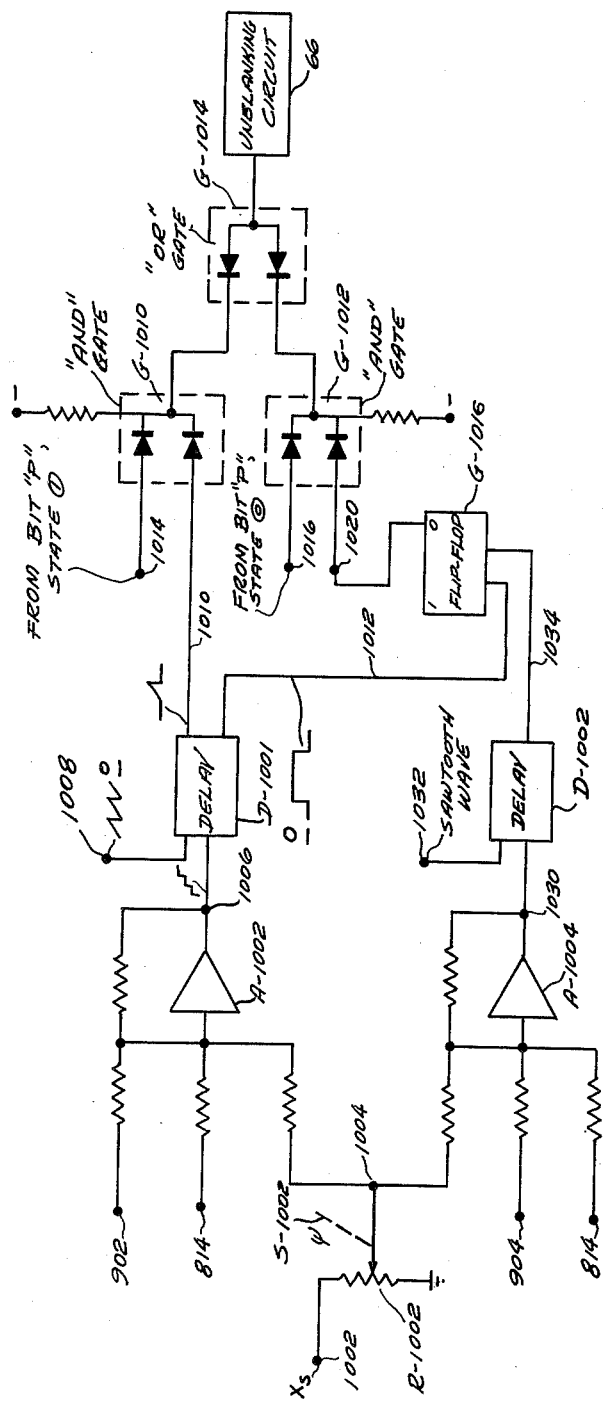

DELAY UNIT

FLIP FLOP GATE

3,081,557
ABSTRACT VISUAL DISPLAY SYSTEM
John R. Mailhot, Vestal, N.Y., assignor to General
Precision, Inc., a corporation of Delaware
Filed Apr. 6, 1960, Ser. No. 20,373
12 Claims. (Cl. 35—12)

This invention relates to visual display systems and, in particular, to an electronic display system for simulating the appearance of an airfield during the approach and landing of aircraft, and especially for simulating the appearance of an airfield during the simulation of approaches and landings by aircraft simulators.

In order to adequately train pilots in procedures used in approaching and landing on airfields, where the training involves the use of aircraft simulators, it is necessary to provide visual displays corresponding to the runways being approached. Such displays necessarily are positioned with respect to the cockpit in some manner so that a student pilot will have the visual sensation of approaching an airfield in the same way that he would if he were in an actual airplane approaching an airfield. The object of such visual displays, therefore, is to enhance the realism associated with aircraft flight simulators and to make it possible for pilots to receive practice in landings and take-offs of aircraft without subjecting themselves and aircraft to the risk of damage or injury and without tying up expensive aircraft for training purposes.

A number of approaches to the provision of visual displays in simulators have been taken in the past. Among these are what might be called panoramic displays, television displays, and cathode ray tube displays. The term panoramic displays is arbitrary and it has been introduced here to include any pictures of airfields, landing strips or horizons which provide a larger field of view than is needed for immediate presentation purposes and which may be shifted in some fashion so that various portions of the picture may be displayed as needed. In order to provide such visual displays, certain simulators have included pictures which are placed on fixed or movable walls and related to a cockpit in such a way that any desired portion of the pictures may be brought in front of the cockpit for the benefit of the pilot. Such presentations may be of sufficient realism to give the impression of flying with a landscape in the distance, but there is obviously no way in which the cockpit can appear to move into the picture, as for example to land on an airstrip in the picture.

Another type of panoramic display which has been used has consisted of pictures on a movable belt which included in some cases small models of the terrain surrounding an air strip or the like. This type of presentation permits the cockpit to appear to move into the picture, but fails to provide for sufficient realism in the surroundings as well as being inherently incapable of providing the proper degree of realism insofar as perspective is concerned.

A third type of display which may be said to fall in this general category is that formed by motion pictures projected on a screen. In many ways this presentation is superior to pictures which are merely fixed on walls or on movable belts, since relationships of perspective and surrounding terrain may be reasonably well presented. But whether the picture is presented on a screen placed away from the cockpit, or is projected on a translucent windshield which is a part of the cockpit, no completely satisfactory way of representing changes in perspective which occur with lateral shifts in the position of the cockpit has yet been published. None of the display systems listed so far has as yet been adapted to successfully simulate the appearance of the ground as an aircraft approaches the ground along a variety of courses. In other words, none of these prior art displays has succeeded in simulating the changes in perspective which will occur if the pilot deviates from a course down the center of the runway. The instant invention uses an electronic display system totally unlike any of the foregoing in order to provide for changes in perspective, distance from the display and the appearance of entry into the display.

Another type of display which has been used in the prior art consists of a closed circuit television system which employs models, a television camera, projecting means and the necessary precision mechanical support means for securing and projecting the picture. Apparatus of this type has overcome most of the objections which may be raised to the prior art equipment, since it provides a display which is taken from a scale model by a camera lens which may be positioned exactly with respect to the scale model as an airplane would be while flying under the conditions being simulated. It is apparent that this type of display embodies a high degree of realism, being limited chiefly by the resolution power of the television system, the realism of the model, and above all by the heavy expense entailed in providing means for positioning the television camera accurately with respect to the model. The instant invention avoids the heavy expense of the television display systems; dispenses with the need for models, television cameras and positioning equipment; and, at the same time, provides a sufficiently realistic display of all of the essential features of an airfield to enable pilots to obtain optimum training by making simulated landings.

The last type of display system referred to above is a cathode ray tube display which embraces the instant invention. Cathode ray tube displays may be said to differ from television displays for our purposes in that a cathode ray tube display may be generated electrically and need not require the use of models or a camera as does a television system. Insofar as is known, there is no published art which is in point. However, it will be recognized that various analog techniques may be employed to control the sweep circuits of a cathode ray tube to generate displays of the type being considered. The instant invention however has gone beyond the analog approach and provides computer means employing digital techniques to locate the desired display portions very accurately and converts to a mixture of analog and digital signals in order to actually operate the cathode ray tube circuits. This invention is adaptable to the simulation of such displays for use in actual aircraft as well as in simulators.

It is an object therefore of this invention to provide an improved visual display for the approach and landing phases of flight of an aircraft flight simulator, It is an additional object of this invention to provide an improved visual display system for use with flight simulators which may be presented on a cathode ray tube or by projection of the image appearing on such a tube, without requiring the use of a three-dimensional model and all the paraphernalia pertinent thereto, It is another object of this invention to provide an improved visual display for use with flight simulators which dispenses with the need for elaborate mechanical positioning mechanisms for positioning a camera with respect to a three-dimensional model, It is still another object of this invention to provide for the accurate presentation of the approach lights of an airfield as seen from shifting positions in an airplane, It is yet another object of this invention to provide all-electronic means for accurately presenting an airfield as it would appear from an airplane making an approach landing on the field, It is yet an additional object of this invention to provide an abstraction representative of the most significant aspects of the appearance of an airfield by means of digital and analog computer techniques applied to a cathode ray tube.

The foregoing objects and others ancillary thereto may be accomplished by the present invention through the provision of a cathode ray tube display which may be viewed directly, or projected. A preferred embodiment of the invention provides a display representing lights appearing at the approach end and along the sides of an airport runway, though it may include other lights or physical features of an airport.

In order to provide the desired display, a source of clock pulses is employed which provides a sawtooth wave and also a separate series of pulses synchronized with the sawtooth wave. The sawtooth wave controls the horizontal sweep of the electron beam in a cathode ray tube. The pulses operate a digital counter which runs repeatedly from a value 0 to N, where 0 is the bottom and N is the top row of display on the cathode ray tube. The outputs from various elements of the counter operate a plurality of "and" gates each of which controls an electronic switch in an electronic computer. The combination of "and" gates and electronic switches with certain resistors may be said to operate as a digital to analog converter, since it converts the digital inputs from the counter into discrete changes in resistance in the analog computer. The analog computer then provides two analog type outputs, the magnitudes of which are determined by which resistors are placed in the computer circuits. The outputs determined in this way are in discrete steps instead of in truly continuous waves.

The output signals provided by the computer control the vertical position of the electron beam and also provide signals to a logic circuit which determines when the electron beam will be unblanked to form each portion of a typical display. The size and shape of the typical display is varied in accordance with changes in apparent altitude and range of the aircraft by use of potentiometer means coupled to receive said output potentials and transmit them to the vertical control and logic circuits. Additional signals, representing deviations in lateral aircraft position and in attitude, are also provided from the aircraft simulator to the vertical deflection circuit and to the logic circuits controlling the unblanking circuit. These signals alter the pattern displayed on the cathode ray tube to change the appearance of the airfield on the display when the simulated aircraft is moved off course or its attitude is changed.

Figure 2:
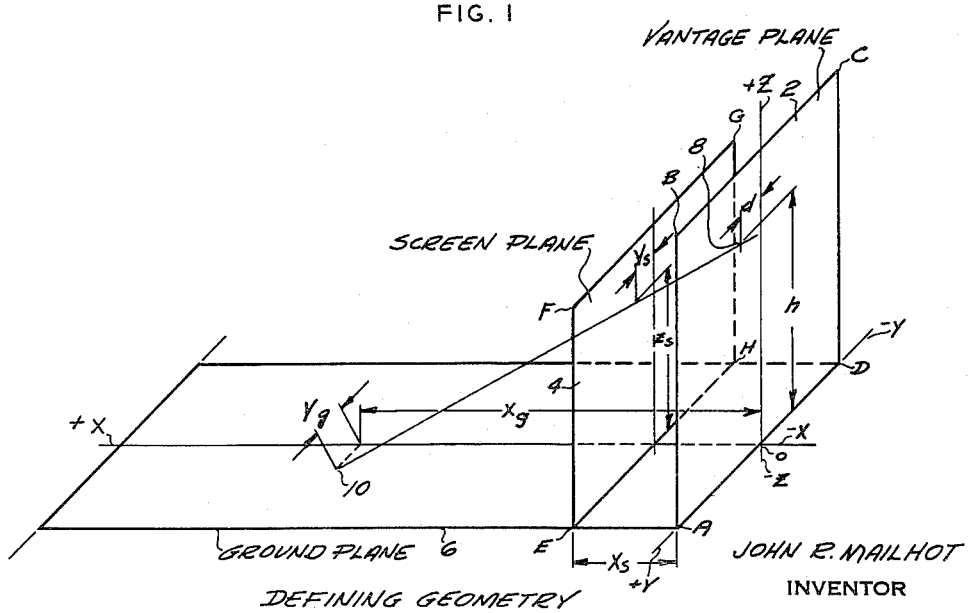
Figures 3, 4:
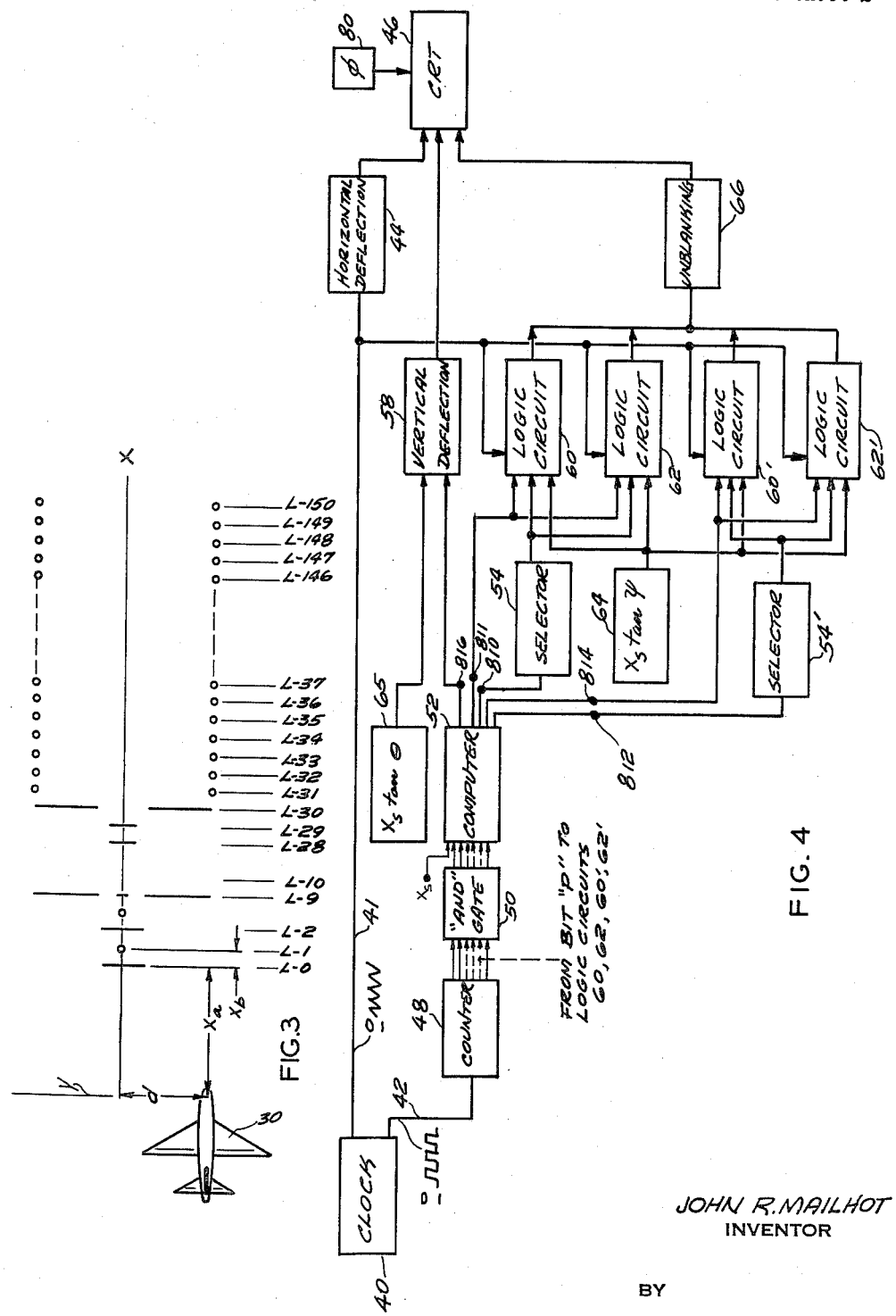
Figure 11:
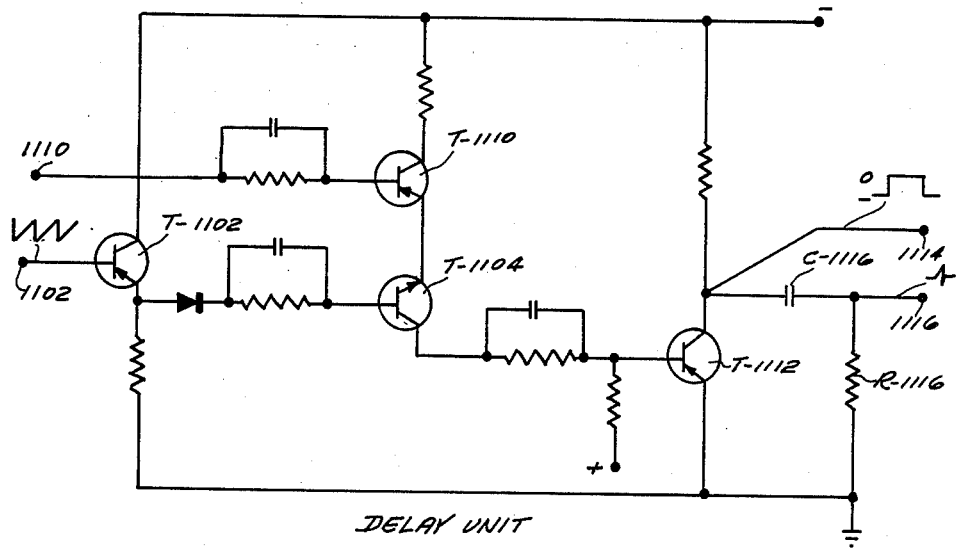
Figure 12:
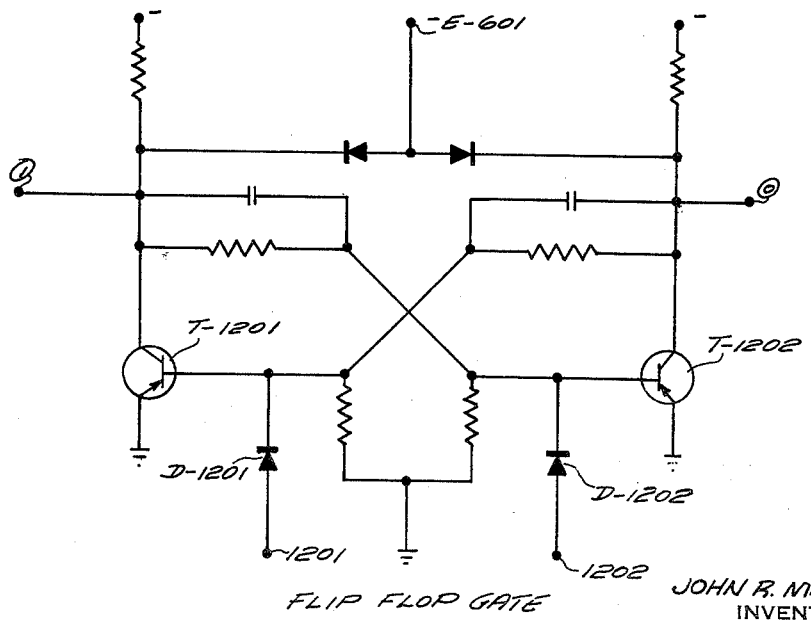

The novel features that I consider characteristic of my invention are set forth with particularity in the appended claims. The invention itself, however, both as to its organization and its method of operation, together with additional objects and advantages thereof, will best be understood from the following description of specific embodiments when read in connection with the accompanying drawings, in which:

FIG. 1 is a view of a cathode ray tube or a projection screen showing a typical view of a visual display generated by the instant invention, FIG. 2 is a perspective view illustrating geometry which is of interest in the explanation of the instant invention, FIG. 3 is a plan view depicting the lighting of an airport and certain relationships between that lighting and approaching aircraft, FIG. 4 is a block diagram illustrating the essential features of the instant invention, FIG. 5A is a schematic diagram illustrating an electronic clock of use in the practice of the instant invention, FIG. 5B and FIG. 5C illustrate wave forms provided by the electronic clock of FIG. 5A, FIG. 6A is a schematic diagram of a typical binary computer stage of use in the practice of this invention, FIG. 6B is a block diagram illustrating the interconnection of a plurality of binary computer stages such as those in FIG. 6A, FIG. 7A is a schematic diagram illustrating an "and" gate and decoding switch of use in determining vertical position from a cathode ray tube and also for determining spot positions along each horizontal path of the electron beam in said cathode ray tube, FIG. 7B is a block diagram of a decoding matrix employing circuits such as are shown in FIG. 7A to provide a plurality of outputs, FIG. 8 is a computer for providing signals for use in locating the individual segments of the desired visual display, FIG. 9A is a schematic and FIG. 9B is a block diagram of electronic selectors of use in the present invention to provide additional signals needed for the determination of the location of the individual components of the visual display, FIG. 10 is a block diagram of a logic circuit which may be used in conjunction with the other circuits of this invention to determine when the unblanking circuit of the cathode ray tube should be operated to provide the necessary electron beam required to generate a visual impression on the cathode ray tube, FIG. 11 is a schematic diagram of a delay unit for use in the logic circuit of FIG. 10 to assure the proper spacing on the visual display, and FIG. 12 is a schematic diagram of a transistorized multivibrator which may be used as a gate in conjunction with the logic circuits of FIG. 10.

Before presenting a detailed description of a preferred embodiment of the instant invention, it would be well to discuss first some of the considerations which have entered into work on the invention. Studies have been made to determine which visual cues are most necessary to train pilots to make consistently good landings. As a result of these studies it was found that with a display consisting basically of a trapezoid representing a runway and a horizontal line representing the horizon it was possible to train students in proper approach and landing techniques for aircraft. A display representing such bare outlines is of course an abstraction of reality representing as it does only the barest essentials characteristic of airfields. This idea of using an abstract display has been adapted to the display of the instant invention which is primarily intended for night landings. The display, which may be similar to that of FIG. 1 consists of a trapezoid the sides of which are made of spots of light to represent runway boundary lights and the base of which is made of bars and spots of light to represent the approach lighting of an airport. The location and shape of the trapezoid will be changed automatically and appropriately in accordance with the flight of an aircraft simulator. As has been previously indicated, the display is formed electronically and does not require an actual model.

The display of FIG. 1 may be produced by employing the preferred embodiment of the instant invention which is described in this disclosure. In order to provide this display, signals proportional to the location of the various lights of an airport are generated electronically. These signals are continuously altered to correspond to changes in the perspective and in the attitude of an observer viewing the scene from various locations. The application of these altered signals to the deflection circuitry of a cathode ray tube will produce a display of the airport lights corresponding to the location and attitude of the trainee. The display can then be presented to the trainee directly by using a large cathode ray tube placed in front of the windshield, or indirectly by projecting the image on a screen in front of the simulator by means of Schmidt optics.

The present invention may be better understood by considering the geometry shown in FIG. 2. In FIG. 2 three planes are shown, two of which are perpendicular to the third. The plane defined by any three of the letters A, B, C, D at four points in the face of the plane is called the vantage plane and represents all of the points from which an observer can view images appearing on a screen in the screen plane 4, which may be defined by any three of the four points E, F, G, H. As indicated in FIG. 2, the vantage plane 2 and the screen plane 4 are perpendicular to the ground plane 6, which may be defined by any three of the four points A, D, E, H. A Cartesian coordinate system having its origin at an intersection point 0 of the vantage plane 2 and the ground plane 6 is indicated with the sign convention shown in FIG. 2. An observer at a point 8 may then be defined as located a distance $h$ above the origin and a distance $d$ parallel to the Y axis from the origin. Any point 10 may be chosen in the ground plane a distance $X_g$ away from the Y axis and a distance $Y_g$ away from the X axis. Adopting these conventions, the coordinates of the observer are $(O, d, h)$ and the coordinates of the ground point are $(X_g, Y_g, O)$. An equation for the line joining these two points may be given as follows:

$$\frac{X-X_g}{-X_g}=\frac{Y-Y_g}{d-Y_g}=\frac{Z}{h} \quad (1)$$

where $(X, Y, Z)$ is any point on this line. If we place this point $(X_s, Y_s, Z_s)$ on the screen plane then:

$$Y_s = d - \frac{X_s}{X_g}(d-Y_g) \quad (2)$$

$$Z_s = h - h\frac{X_s}{X_g} \quad (3)$$

These are the equations for the intercept point on a screen plane extending from the ground plane to the actual aircraft. The location of this intercept point can also be measured with respect to the eye of the supposed Cyclopean observer, that is $$Y_s' = -X_s\left(\frac{d-Y_g}{X_g}\right) \quad (4)$$

$$Z_s' = -X_s\left(\frac{h}{X_g}\right) \quad (5)$$

where $Y_s'$ is the distance along the Y axis from the eye of the observer to the intercept point in the screen plane and $Z_s'$ is the distance along the Z axis from the eye of the observer to the intercept point in the screen plane. These equations form the basis for transforming the pattern of runway lights into the proper perspective for any vantage point assumed by the trainee.

These equations do not consider, however, the effects of changes in attitude. The effects of changes in attitude such as roll, pitch and heading may be represented by Equations 4 and 5, if those equations are modified by rather complicated trigonometric functions. It may be shown that these complicated trigonometric functions can be greatly simplified if assumptions are made that the actual screen on which the display is to be presented is but a small section of a sphere of radius $X_s$ which is centered at the eye of the observer, and the attitude angles involved are small. Employing these assumptions, it can be shown that a pitch angle $\theta$ results in an additional shift of $Z_s'$ by an amount $X_s \tan \theta$. It can also be shown that a heading angle change represented by the angle $\psi$ results in an additional shift of $Y_s'$ by an amount $X_s \tan \psi$. A roll angle $\phi$ results in change in both $Y_s'$ and $Z_s'$. These relationships may be incorporated in the preferred embodiment of the present invention by first performing the perspective alteration due to changes in positions in the vantage plane 2 and then adding the effects of pitch and heading. The resulting image may then be rotated through an angle $\phi$ to simultate the effect of roll.

In order to present a satisfactory display it is necessary to solve Equations 4 and 5 for all of the points of the runway and approach lights. By solving these equations rapidly, and displaying the computed location for each point on the face of the cathode ray tube, the entire display can be presented. In order to prevent flicker of the display each point is computed at a rate in excess of 30 times per second.

The term $X_g$, Equations 4 and 5, can be replaced by the term $(X_a + NX_b)$ where $X_a$ is the distance along the X axis from the aircraft to the first light, $X_b$ is the distance between the various rows of lights, and N is an integer locating the particular row under consideration. Reference is made to FIG. 3 for further clarification of these terms. This substitution assumes that $X_b$ is a constant for all the rows of lights, however this need not be so, as will be shown later in connection with the feedback resistors used with the computer. Making the indicated substitutions in Equations 4 and 5, it is possible to rewrite these equations as follows:

$$Y_s' = -X_s\frac{d-Y_g}{X_a+NX_b} \quad (6)$$

$$Z_s' = -X_s\frac{h}{X_a+NX_b} \quad (7)$$

FIG. 3 represents a plan view of a typical nightlighted airport with an aircraft represented at 30 to indicate some of the relationships of some of the terms set out in the equations. The axis of the system illustrated in FIG. 2 can be superimposed on the display of FIG. 3 with the X axis made coincident with the center line of the runway. The bars and spots of light shown in the landing pattern of FIG. 3 can be considered to define lines or rows perpendicular to the X axis as shown in the figure. The numbering of the rows 0 through 150 represents the term N shown in Equations 6 and 7. In the typical airport chosen to be represented by FIG. 3, there are 30 approach lights shown between lines L–0 and L–30 which are spaced 100 feet apart, and there are 120 runway marker lights between line L–31 and the line L–150 which are also spaced 100 feet apart. The dimensions are recited merely to indicate the general nature of a typical airport which may be simulated. A total of 150 lights are shown running from L–0 through L–150, but of course a larger or smaller number may be employed without departing from the invention.

A block diagram of an exemplary circuit for the practice of this invention is illustrated in FIG. 4. In that figure an electronic clock is indicated at block 40 to provide two groups of output pulses, the first consisting of a sawtooth wave form supplied to line 41 and the second consisting of pulses of substantially rectangular form supplied to line 42. The sawtooth wave form is supplied to the horizontal deflection circuit 44 of the cathode ray tube 46 to control the horizontal deflection of the beam of said cathode ray tube. This sawtooth wave is also supplied to the logic circuits at 60, 60', 62 and 62'. Thus it will be seen that the cathode ray tube electron beam will be deflected horizontally respectively at a frequency corresponding to the operating frequency of the sawtooth sweep generator in clock 40, and at a constant sweep amplitude or sweep range.

The square wave pulses supplied by block 40 over line 42 are fed into an electronic counter, indicated at block 48, which operates in a conventional manner to provide outputs to a plurality of "and" gates indicated in block 50, which in turn supply a plurality of outputs to a computer indicated in the block diagram at 52. The counter 48 and "and" gates 50, together with certain electronic switches which are included in the computer at 52 and are controlled by the output of the "and" gates, assure that quantized signals suitable for the operation of the vertical deflection circuits and the unblanking logic circuits in FIG. 4 are generated. The outputs of counter 48 include outputs from a Bit "P" which are fed to logic circuits as indicated in the figure. The computer 52 provides five output potentials which are fed variously to the vertical deflection circuit at 58, a selector 54, a selector 54′, and logic circuits at 60, 60′, 62 and 62′ as indicated in FIG. 4. Terminals 810, 811, 812, 814 and 816 shown in FIG. 4 relate to FIG. 8 and are inserted in FIG. 4 to aid in the description of the invention in connection with FIG. 8. The operation of the computer and the significance of the terms used in the description thus far are explained more fully in connection with the description of FIG. 8. The block at 64 represents a circuit supplying output signals to the logic circuits at 60, 60′, 62 and 62′ to modify the timing of the unblanking signals in accordance with the instantaneous heading of the simulated aircraft with respect to the centerline of the simulated airfield light pattern. Block 65 represents means for deriving a signal commensurate with the instantaneous pitch angle of the simulated aircraft. The signal is applied to bias the vertical deflection circuit 58, thereby to shift the generated display vertically on the CRT screen in accordance with simulated pitch angle. The vertical deflection circuit 58 controls the vertical positioning of the electron beam in the cathode ray tube 46. The logic circuits 60 and 62, or the logic circuits 60′ and 62′, operating in pairs, control the unblanking circuit 66, which in turn assures that the electron beam is unblanked properly to provide dots and lines corresponding to a visual representation such as that shown in FIG. 1. A block 80 is shown coupled to the cathode ray tube 46 to provide an input signal proportional to bank angle $\phi$ to the deflection coils of the cathode ray tube thereby to rotate the entire displayed pattern and thus realistically simulate the effects of changes in simulated bank angle on the display viewed by the student pilot.

The circuit disclosed in FIG. 4 will provide light spots and light bars as shown in FIG. 1. The unblanking of the CRT to generate the bars and lights in the left half of the figure, or more properly the left half of the runway, is controlled through the circuitry of elements 54, 60 and 62. These circuits are duplicated at 54′, 60′ and 62′, which latter circuits control CRT unblanking to generate the bar and lights along the right-hand side of the runway shown in the right half of FIG. 1.

Referring now to FIG. 4, there is shown a basic timing or electronic clock circuit 40, one form of which is shown in detail in FIG. 5A. In the detailed circuit of FIG. 5A, tube 501 is a thyratron, the firing potential of which is controlled by its grid voltage E–501 and its anode voltage V–502. Initially, the variable voltage V–502 will be zero, but it will build up at a rate determined by the RC time constant of R–502 and C–502. When the voltage V–502 becomes sufficiently large, thyratron 501 will fire, discharging condenser C–502 rapidly and lowering the voltage V–502 at point 502, causing the thyratron to be cut off again. The foregoing series of events will occur repeatedly and cyclically, to provide a sawtooth voltage V–502 at point 502. This sawtooth voltage is coupled through a capacitor C–504 to the base of the transistor T–501, which is operated as an emitter follower to prevent loading of the voltage V–502. The first output of the electronic clock circuit is supplied from the emitter terminal of the transistor T–501 to a terminal labelled 504. This first output potential is a sawtooth voltage having the polarity and shape shown as output No. 1 in FIG. 5B. This same output voltage is applied through a circuit made up of resistor R–506 and condenser C–506 to the base of the transistor T–502. Transistor T–502 is coupled to an additional transistor T–503 in the manner indicated in FIG. 5A to form a single-shot multivibrator. Normally, transistor T–502 of this multivibrator is cut off and transistor T–503 is saturated, however, the negative leading edge of the sawtooth wave illustrated in FIG. 5B saturates the transistor T–502 which in turn cuts off the transistor T–503. Transistor T–502 remains saturated as the sawtooth voltage begins to return to zero, but it cuts-off at some point when the net voltage on the base becomes positive. When transistor T–502 cuts-off following its saturated period, it will cause transistor T–503 to become saturated and return the elements to their original state. Repeated cycles of states of saturation between transistor T–502 and transistor T–503 will thus provide an output (No. 2) at a terminal 508 which would be a wave of the form and having the polarity indicated in FIG. 5C. Only the elementary features of the circuit appearing in FIG. 5A have been discussed. A number of resistors, capacitors and diodes necessary to the operation of this circuit as well as the polarities of the voltages required are merely indicated, since their functions and magnitudes will be recognized to depend upon factors which are well known to those skilled in the art.

The rectangular pulse signals at terminal 508 are applied via line 42 (FIG. 4) to operate binary counter 48, one suitable form of which is shown in more detail in the block diagram of FIG. 6B. Each of the blocks in FIG. 6B, which are labelled Bit 1, Bit 2 . . . Bit N, is a conventional multivibrator or "flip-flop" consisting of two transistor stages, each having positive feedback to the other. At any given time, one of the transistors will be cut off, the other saturated. Output voltage number 2 from terminal 508 of the electronic clock enters the first flip-flop in the chain at a point such as 602. Before reaching points indicated by symbols ① and ⓞ, it is differentiated by series circuits R–601, C–601, and R–603, C–603, indicated in FIG. 6A. The output voltages at points ① and ⓞ are, therefore, positive-going spikes. Assuming initially that transistor T–601 is saturated, and transistor T–602 is cut off, a positive spike through condenser C–603 will have no effect. However, a positive spike through C–601 would almost instantly cut off transistor T–601 by reverse-biasing the emitter-base diode of transistor T–601. This, in turn, will cause the voltage at ① to go from zero to —E–601. This negative-going signal is fed to the base of transistor T–602 through the parallel circuit consisting of condenser C–605 and R–605, turning this transistor "on" and causing it to saturate. This, in turn, causes the voltage at ⓞ to rise from —E–601 to zero. Points ① and ⓞ will remain in this state until another positive going pulse spike is applied to point 602. When this happens, the reverse procedure will take place, T–601 will saturate, T–602 will be cut-off, and the unit will return to its original state. Thus, for every other pulse applied to point 602, a positive going pulse will appear at point ⓞ. This pulse is used to trigger the next flip-flop in the chain. Therefore, each flip-flop in the chain will change states at one-half the rate of the preceding unit.

Each flip-flop represents one binary number or bit. When the voltage —E–601 appears at point ⓞ of a flip-flop, the flip-flop is said to be in the zero state. When the voltage —E–601 appears at point ① it is said to be in the one state. There will be as many flip-flops in the chain as are required to represent N of Equation 6 and 7 as a binary number. The output from the individual portions of the binary counter are indicated in FIG. 6B by the symbols 1–1, 1–0, 2–1, 2–0, . . . N–1, N–0. The symbol on the left in each of these stages represents the bit position such as bit No. 1, bit No. 2, etc.—the number to the right of the dash indicates whether it is the output of the ① or the ⓞ of the particular flip-flop. The outputs of the blocks represented in FIG. 6B, it will be recognized, are supplied through a pair of lines from each counter stage to circuit 50, as shown in FIG. 4.

The output signals from the counter illustrated in FIG. 6B and also represented at 48 of FIG. 4 consist of a pulse or no pulse on a plurality of parallel lines and, as such, are unintelligible signals insofar as the cathode ray tube is concerned. In order to convert these binary signals to more useful form a plurality of "and" gates, indicated at block 50 of FIG. 4 and in FIGS. 7A and 7B, are employed to control the number of individual switches which are connected successively in the feedback circuit of a summing amplifier to control the output of said amplifier. The conversion of the binary outputs of the counter to quantized values which correspond to arabic numbers in the particular circuits being used may be provided by circuits such as those shown in FIG. 7A and FIG. 7B.

Turning to FIG. 7A, it should first be noted that the portion of this circuit to the left of the vertical dashed lines represents a conventional diode "and" gate which is operative to produce an output signal when, and only when, a negative voltage is supplied simultaneously to all of terminals 701, 702, 703 and 704. The portion of FIG. 7A to the right of the dashed line, and including the transistor T-701 functions primarily as a switch in response to the output of the "and" gate. When a negative voltage is supplied to each of the terminals 701 through 704, transistor T-701 will be saturated and current will flow between its collector and its emitter to provide an output at terminal 710. In case the required negative potential is not available on all four of the input terminals 701 through 704, T-701 will not saturate and the switch will remain open.

A plurality of triangles is shown in FIG. 7B, each of which represents a portion of the decoding matrix similar to the circuit shown in FIG. 7A and particularly the portion of FIG. 7A to the left of the dash line. Combinations of negative inputs on the input terminals from different parts of the counter will activate the corresponding "and" gates and a switch connected to each of them. The pairs of numbers placed adjacent to the input terminals of each of the blocks in FIG. 7B represent the location in the binary counter of the input signals for the "and" gates and decoding switches. The number on the left of each of these pairs of numbers represents the bit number and the number on the right represents the portion of the bit, i.e. the terminal indicating zero or one, to which the connection is made. Physically, each of the terminals is actually connected to either the ⓪ or the ① terminal of the corresponding bit indicated on the left. A total of 15 circuits are shown in FIG. 7B, so that the output of these circuits can correspond to Arabic numbers or numbers having a base of ten. Numbers, N, from 1 through 15 can be indicated by this circuit, but it will be recognized that any practical value of N may be represented by adding additional stages to the counter of FIG. 6B and a corresponding number of "and" gates and transistor switches. The circuits shown in FIGS. 7A and 7B correspond partially to block 50 in the block diagram of FIG. 4 and partially to block 52. Insofar as the "and" gates themselves are concerned the block 50 is all inclusive, but the transistor switches are placed in feedback circuits of the computer designated by the block 52.

The computer shown in the block diagram of FIG. 4 at 52 is illustrated in detail in FIG. 8. As shown in FIG. 8 the "and" gates in block 50 are connected to switches $S_{w-1}$ through $S_{w-150}$, each of which corresponds to a transistor like T-710 in FIG. 7A. 150 switches are indicated to correspond to the 150 separate values of N which must be used in order to generate the 150 lines of intelligence indicated in FIG. 3, but a different number may be employed to generate a different display. The switches normally are open, but are closed by signals from the "and" gates successively to short out portions of potentiometer R-802 and thereby to change the gain of amplifier A-802. A feedback potential which is a function of $X_a$, the distance from the simulated aircraft to the airfield, is supplied from potentiometer R-804 to the amplifier A-804 through the connections shown in order to provide an additional variation for the gain of amplifier A-802 and thereby to divide the input signal $X_s$, applied at terminal 800, by the quantity $X_a + NX_b$ and thus to generate a required signal preparatory to providing the signals required as solutions of Equations 6 and 7. The term $X_a$, which represents the ground distance between the instantaneous aircraft position and a reference point on the runway, such as the threshold or first light row of the runway, may be either positive or negative depending on the relative position of the simulated airfield and the simulated aircraft. Amplifier A-802 will be seen to include two feedback circuits, one applying a feedback potential from potentionmeter R-804 commensurate with $X_a$, the distance between the simulated aircraft and the airfield lights, and the second feedback circuit applying a feedback potential from voltage divider R-802, the latter feedback potential varying in a series of discrete steps as electronic counter sequentially closes the various transistor switches driven by the "and" gates of circuit 50. The output of amplifier A-802 is made available at terminal 810 and across a potentiometer R-814. A quantity of equal magnitude but opposite polarity is supplied by amplifier A-804 to terminal 812 and also to the opposite end of potentiometer R-814 and to potentiometer R-816. The wiper arm of potentiometer R-814 may be positioned in accordance with a quantity $d$, the lateral distance of the aircraft from a straight line over the center of the runway, and the wiper arm of potentiometer R-816 may be positioned in accordance with the term $h$, the altitude above the runway, in order to provide additional potentials representing terms of the equations as indicated at terminals 811, 814 and 816 which are required to generate the desired display. It will be recognized that the potentials $X_s$, and the shaft positions according to $X_a$, $d$ and $h$ can be supplied from a conventional analog flight simulator and may be provided from computing means coupled to distance measuring devices, which determine their values, when actual aircraft are involved. The potential proportional to $X_s$, which is the distance between the screen plane and the vantage plane of FIG. 2, will be a constant for any given set up of viewing screen and aircraft cockpit. Furthermore, it will be recognized that feedback amplifiers such as A-802 and A-804 are used to generate fractions by varying their gain as indicated in FIG. 8.

The potentials appearing at terminals 810 and 812 contain the necessary information for the generation of a display such as that shown in FIG. 1, where the aircraft is assumed to be flying toward the center of the runway at a distance $X_a$ from the end of the runway, where no consideration is made of the attitude of the aircraft, the elevation of the aircraft or of its deviation from a line through the center of the runway. The values of $d$, which may be called a deviation from the center of the runway, and $h$, which amounts to elevation of the aircraft above the airfield, are introduced as multipliers of the potentials appearing at terminals 810 and 812 and on the wiper arms of potentiometers R-814 and R-816 and thus decrease the size of the image generated on a cathode ray tube face and also introduce factors tending to alter the shape of the image in accordance with apparent elevation above the airfield and distance to the right or left of the center of the runway.

The output signals appearing on terminals 810 and 812 of FIG. 8 are such that they can locate the lines N in the display by deflecting the vertical deflection circuit of the cathode ray tube. That is, they can provide the position of the line N, if the simulated aircraft is flying a level course directly over a line through the center of the airstrip. Certain corrections must be applied to compensate for flight deviations from this narrow course. It should be emphasized that these potentials determine the value N and determine the spacing between the horizontal lines on the display device, but that they do not locate the position of the individual dots on those lines to provide the actual display. In order to generate these dots and lines, the potentials at terminals 810 and 812 must be modified by quantities proportional to $+Y_g$, where the term $Y_g$ signifies the location from the X axis of a visible dot on the display as indicated in the geometrical definitions of FIG. 2. In order to determine this value $Y_g$, an electronic selector has been devised as indicated in FIG. 9A.

The electronic selector of FIG. 9A, corresponding to block 54 or 54' in FIG. 4, is very similar in principle to the electronic switch network and potentiometer of FIG. 8. Specifically, it employs the "and" gates 50 of FIG. 4 to provide control signals for each of a plurality of switches which vary the potential drop across the potentiometer R-902 to provide an output at terminal 902 proportional to the quantity $$\frac{X_s Y_{g1}}{X_a + N X_b}$$

The number of switches employed in this circuit may vary widely, depending upon how accurately the spacing of the dots along the side of the trapezoid is to be made. The output from terminal 902 will be used in logic circuits to determine the position of individual dots and the left terminal of display bars such as those indicated in the approach lighting in lines L-0 through L-30 of FIG. 3. In the case of the generation of single dots, the logic circuit will respond to provide an unblanking signal to the cathode ray tube without further signals, but in the case of the generation of long lines or bars of light, an additional stopping signal must be supplied to return the unblanking signal source to its blanking condition.

In FIG. 9A a circuit suitable for the generation of this second information is shown on the right side of the circuitry connected to terminal 810. This circuit consists of a potentiometer, a plurality of switches and connections to the "and" gates of block 50 of FIG. 4, as indicated, but in general will employ fewer switches and fewer connections to the "and" gates than the left portion, since only a relatively few bars will be generated such as thirty-two or so in FIG. 3. The output of this portion of the circuit of FIG. 9A will be available on terminal 904 and will consist of a potential equal to a fraction $$\frac{X_s Y_{g2}}{X_a + N X_b}$$

The circuit thus far described in connection with FIG. 9A will serve to determine the location of dots and bars of light making up the left side of the runway as displayed on the cathode ray tube. A similar circuit employing a positive potential at terminal 812 from FIG. 8 is indicated by block diagrams in FIG. 9B, corresponding to block 54' in FIG. 4, to provide output potentials at terminals 906 and 908 to generate the dots and determine the ends of the bars making up the right side of the runway as displayed on the cathode ray tube. Since the circuits in FIG. 9A and FIG. 9B are much alike, it is believed to be unnecessary to illustrate those in FIG. 9B in detail.

The potential appearing on terminal 902 shown in FIGS. 9A and 10 contains information as to the position of the row of lights appearing on the left side of a display such as that in FIG. 1 and also indicates the left edge of any bar of light shown in FIG. 1 on the left side of the figure. Unfortunately, this information is in the form of a step function or quantized value which is not in a form which may be used directly to effectively control the unblanking circuit. Consequently, means must be provided, such as that shown in FIG. 10, to translate the signal into a form which is intelligible to the unblanking circuit and to the logic circuitry used to control said unblanking circuit. Such a circuit appears in FIG. 10 with input terminals at 814, 902, 904, 1002, 1008 and 1032 to accept additional signals which serve to modify the display in accordance with variations in the position and attitude of the aircraft.

Turning now to a detailed discussion of the means for changing the analog signal representing the position of the lights along the various rows of display from an analog value to another form suitable for operation of an unblanking circuit, we consider FIG. 10. In FIG. 10, the intelligence showing the position of the dot, or the left edge of the light bar, is available as a potential on terminal 902 from FIG. 9A and is supplied to the summing amplifier A-1002. The amplifier sums the potential from terminal 902 together with signals appearing at terminals 814 and 1004 to provide signals suitable to produce the desired final display, following further modification. The signal appearing at terminal 814 from FIG. 4 provides a correcting value for deviations of the aircraft laterally from a course along an axis located parallel to and directly above the center of the simulator runway. The potential $X_s$ appearing on terminal 1002 is supplied over potentiometer R-1002, which is wound in accordance with a tangent function, so that the heading position of the flight simulator, which is provided on shaft S-1002, will cause a signal to appear on terminal 1004, which is proportional to $X_s \tan \psi$. This will provide an additional modifying signal into amplifier A-1002 which will assure changes in the appearance of the visual display in accordance with changes in heading of the simulated aircraft.

The output from amplifier A-1002, appearing on terminal 1006, contains all the information necessary to insure a proper display of visible dots and the left edges of the visible lines of FIG. 1 but it is still not in usable form. This signal is supplied to the delay unit D-1001, together with a sawtooth wave from terminal 1008, which is supplied from the clock generator of FIG. 5A as shown in FIG. 4. The exact construction and operation of the delay unit D-1001 is described in detail in connection with the discussion of FIG. 11. Suffice it to say now that the delay unit D-1001 provides two outputs which are delayed in time after the start of each horizontal search by an amount proportional to the signal from amplifier A-1002. Delay unit D-1001 has two outputs, one is a spike appearing on line 1010, and the other is a square wave appearing on line 1012. The spikes appearing on line 1010 are supplied to an "and" gate G-1010 together (part of the time) with a continuous signal at terminal 1014 from the state ① of a selected bit "P" of the counter. Bit "P" is located in the counter in such a position that its ① state will continue to be conducting until all of the dots appearing in the upper part of FIG. 1 have been generated and it will then cease to conduct at a time corresponding to that when the first bar of light is to be generated.

Signals appearing simultaneously at terminal 1014 and on line 1010 combine in the "and" gate G-1010 to provide an output signal to an "or" gate G-1014. The signal from delay unit D-1001 still in the form of a spike, will then be transmitted to the unblanking circuit 66 of the cathode ray tube. This signal will unblank the unblanking circuit for a long enough period to form a dot on the surface of the cathode ray tube. Whenever the counter advances to "P," the state ① of that bit will become non-conductive and state ⓪ will begin to conduct so that a signal will be supplied at terminal 1016 and a signal will be removed from terminal 1014. Thus it may be said that "and" gate G-1010 will become "disarmed" and gate G-1012 will become "armed," i.e., gate G-1010 will no longer be activated by pulses on line 1010 but gate G-1012 will provide an output potential whenever a signal appears on its terminal 1020. With the logic circuits in such a state, the next output signals from delay unit D-1001 will have a somewhat different effect. The spike appearing on terminal line 1010 will have no effect on "and" gate G-1010 but the square wave appearing on line 1012 may be supplied through a gate made up of a flip-flop G-1016 to the input terminal 1020 of "and" gate G-1012. A continuous output will then be supplied from the "and" gate G-1012 through the "or" gate G-1014 to the unblanking circuit of the cathode ray tube indicated at 66. The exact mode of operation of the flip-flop G–1016 is explained in detail in connection with FIG. 12.

The operation of the upper portion of FIG. 10 will thus be seen to provide necessary signals to the unblanking circuit of the cathode ray tube to generate the left row of lights appearing in FIG. 1 and also to start the left edges of the bars of light appearing in FIG. 1. In order to stop the generation of light when the right edge of the bars appearing on the left side of FIG. 1 are reached, certain additional circuits exemplified by input terminals 904, 814 (occurrence at the lowest input terminal), amplifier A–1004, delay unit D–1002 and one of the inputs to the flip-flop G–1016 are required. Referring to FIG. 9A, we find that terminal 904 provides intelligence indicating a right edge of the various bars of light appearing only on the left half of FIG. 1. The input at 814 and that appearing on terminal 1004 are the same as were provided on the like numbered terminals on the upper portion of FIG. 10 to provide for changes in lateral position of the aircraft and in heading. These input signals are all summed by amplifier A–1004 to provide an output at terminal 1030 of like nature to that appearing on terminal 1006. The signal appearing at 1030 is compared in a delay unit D–1002 with a sawtooth signal from terminal 1032 to provide an output on line 1034. The output on line 1034 is a square wave which will control flip-flop G–1016 to cause its "1" mode to conduct and thus cut off the input signal to 1020 which in turn will turn off the "and" gate G–1012 and blank the cathode ray through operation of the unblanking circuit 66.

It will be recognized that the circuits disclosed and discussed in FIG. 10 represent only half the logic circuitry necessary to generate a full display. This circuitry corresponds to that in blocks 60 and 62 of FIG. 4. Additional circuits, substantially identical to those in FIG. 10, must be supplied to generate the right half of a full display. Such circuits must be coupled between the selector 54' and the unblanking circuit 66 as indicated at 60' and 62' in FIG. 4. It is clear from FIG. 4 that the inputs which all the logic circuits have in common are $X_s$ tan $\psi$ the sawtooth wave and the two outputs of bit "P." The inputs on terminals 902 and 904 of FIG. 10 would be replaced by inputs from terminals 906 and 908 of FIG. 9B, and the input on terminals 814 would be replaced by the signal on terminal 811 of FIG. 8.

The delay units D–1001 and D–1002 of FIG. 10 are each constructed as shown in detail in FIG. 11. A sawtooth wave is supplied at a terminal 1102 of a delay unit from the electronic clock circuit of FIG. 5A. This signal is supplied to the base of transistor T–1102, which is operated as an emitter follower in order to prevent loading of the sawtooth supply. The sawtooth signal from the emitter of transistor T–1102 is applied to the base of a transistor T–1104 through the diode and circuit shown. An input signal from amplifier A–1002 or amplifier A–1004 of FIG. 10 is applied at terminal 1110 and to the base of transistor T–1110 through the circuit shown. The values of the various elements shown are such that when the sawtooth signal on the base of transistor T–1104 becomes more positive than the input signal to the base of transistor T–1110, both transistor T–1104 and T–1110 will suddenly conduct. This sudden conduction applies a negative signal to the base of the transistor T–1112 which was previously cut off, to turn transistor T–1112 on and saturate it. Thus, the voltage on the collector of transistor T–1112 will step from a negative value to ground potential. This step-up results in the formation of a square wave output which is supplied at terminal 1114 and from there to line 1012 or to line 1034 of FIG. 10. The same signal is differentiated by a differentiator made up of the condenser C–1116 and the resistor R–1116 to provide a spike output on terminal 1116 which may be supplied to line 1010 of FIG. 10. This delay unit with two output potentials may be used in the block diagram D–1001 of FIG. 10. The same delay unit may be used in the block D–1002 of FIG. 10, but only one output, i.e. the square wave, is required in this case.

The flip-flop circuit used in the practice of this invention is very simular to the flip-flop of the binary computer indicated in FIG. 6A. A suitable circuit is shown in detail in FIG. 12 which differs from FIG. 6A in that it has no steering circuit, i.e. condensers C–601 and C–603, resistors R–601 and R–603 are omitted. Positive going pulses from delay unit D–1001 pass through diode D–1201 from terminal 1201 turning diode D–1201 off. Positive going pulses from the delay unit D–1002 of FIG. 10, occurring at some time after those from delay unit D–1001, are directed from terminal 1202 to the diode D–1202, turning transistor T–1202 off, and changing the flip-flop back to a state of conduction in the ① state. During the period on which the flip-flop is conducting from its ⓪ state an output signal will be supplied to the "and" gate G–1012 of FIG. 10 which will keep the cathode ray tube unblanked, assuming the proper signal is available at terminal 1016, to create the appropriate bar of approach lighting.

A number of variations of this invention are possible without deviating from the spirit of the invention. For example, the display may be generated in color instead of in black and white. This would be possible by the use of a tri-colored cathode ray tube, similar to those used in color television sets. It would be possible then by the use of such a tube, together with appropriate coding of the various light locations, to generate lights which could be displayed in their actual color. Another possibility is to vary the intensity of the image produced on the cathode ray tube in order to simulate the effect of haze or fog over the airport. This can be done by attenuating the unblanking pulses corresponding to lights in the distance to thereby reduce the spot intensity on the face of the tube. Lights of equal size located close to the observer may be made to appear larger than those which are further away. This effect can be incorporated into this display by slightly defocusing the electron beam lights close to the observer.

The instant invention can be used for other types of visual displays besides approach and landing of aircraft and simulated aircraft. One such display would be a pattern of grid lines such as might be found on the ground. Such a pattern of grid lines could be transferred to a screen placed in front of the observer. Horizontal grid lines could be formed by the same method that the rows in FIG. 3 were formed, but with the electron beam turned on for the full length of the horizontal grid line. Lines perpendicular to the horizontal lines could be formed by first computing the location of the end points of the lines, and the slope of the lines. Then the electron beam could be positioned on the screen at the location of the end point and moved along the slope determined for each line.

This invention, as has been indicated previously, may be used in actual aircraft. The same methods of computation and display could be used in an actual aircraft to present to the pilot a more realistic view than can normally be obtained with conventional ILS instruments.

This invention offers two principal advantages over previous types of visual displays. First of all, no actual physical model is required, since the generation of images depends upon the use of resistors which are made proportional to the location of the various lights. Secondly, this invention, by doing away with the need for a scale model such as has been used heretofore, dispenses with the need for expensive servomechanisms and elaborate and expensive carriage means to support the servomechanisms.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawing shall be interpreted as illustrative and not in a limiting sense.

Having described my invention, what I claim as new and desire to secure by Letters Patent is:

1. A visual display system for simulating the appearance of airfield landing lights as seen from a shifting viewpoint comprising a cathode ray tube and including horizontal and vertical control circuits to position an electron beam, a binary counter, an electronic clock for providing a sawtooth signal to the horizontal control circuits and a plurality of pulses to the binary counter, a function generator including a binary to analog converter circuit coupled to said binary counter for providing control signals to said control circuits to control the vertical position of said electron beam, and unblanking means responsive to additional signals derived from said function generator for unblanking said electron beam selectively to provide the desired visual display.

2. A visual display system for simulating the appearance of an airfield comprising a cathode ray tube including horizontal and vertical control circuits to position an electron beam and an unblanking circuit to unblank said beam, a binary counter, an electronic clock for providing a sawtooth signal to the horizontal sweep control circuits and a plurality of pulses to the binary counter, a function generator including a binary to analog converter circuit coupled to said binary counter for providing control signals to said vertical control circuit to control the vertical position of said electron beam, and means connecting additional signals from said function generator to said unblanking circuit for unblanking said electron beam selectively to provide a desired visual display.

3. A visual display system for simulating the appearance of an airfield comprising a cathode ray tube including horizontal and vertical control circuits to position an electron beam, a binary counter, an electronic clock for providing a sawtooth signal to the horizontal sweep control circuits and a plurality of pulses to the binary counter, a function generator including a binary to analog converter circuit coupled to said binary counter for providing control signals to said control circuits to control the vertical position of said electron beam, and unblanking means responsive to additional signals from said function generator for unblanking said electron beam selectively to provide a desired visual display.

4. A visual display system for simulating the appearance of an airfield as seen from a simulated airplane comprising a cathode ray tube and including horizontal and vertical sweep control circuits to position an electron beam, a binary counter, an electronic clock for providing a sawtooth signal to the horizontal sweep control circuits and a plurality of pulses to said binary counter, a function generator including a binary to analog converter circuit coupled to said binary counter for providing control signals to said sweep control circuits to control the vertical position of said electron beam, logic circuit means responsive to said control signals and to additional signals including said sawtooth signal and signals representing changes in attitude of said simulated airplane for providing an unblanking signal and unblanking means responsive to said unblanking signal for unblanking said electron beam selectively to provide a desired visual display.

5. A visual display system for simulating the appearance of an airfield as seen from a simulated airplane comprising a cathode ray indicator including horizontal and vertical control circuits to position an electron beam, a binary counter, an electronic clock for providing a sawtooth signal to the horizontal control circuits and a plurality of pulses to the binary counter, a function generator including a binary to analog converter circuit coupled to said binary counter for providing control signals to said control circuits to control the vertical position of said electron beam, means for supplying correcting signals to said control circuits to represent changes due to deviations in the course and in the attitude of said simulated airplane, and unblanking means responsive to additional signals from said function generator and to said correcting signals for unblanking said electron beam selectively to provide a desired visual display.

6. A visual display system for simulating the appearance of an airfield at night comprising a cathode ray tube including separate horizontal and vertical control circuits to position a cathode beam, an electronic binary counter having a plurality of output terminals, an electronic clock for generating a sawtooth wave and a train of pulses, means connecting said sawtooth wave to said horizontal control circuits to provide for horizontal sweep of the cathode beam, means coupling said train of pulses to said electronic binary counter, a plurality of "and" gates, said electronic binary counter providing a plurality of digital outputs over parallel lines to said "and" gates, a digital to analog converter including a plurality of resistors arranged to be connected by electronic switches in an amplifier feedback circuit to vary the gain of the converter, means connecting said "and" gates to said electronic switches to vary said gain and control the output of said converter, means for supplying a factor representing the effects of pitch, means for multiplying the output of said converter by simulated altitude, means for adding said factor representing the effects of pitch to said quantity proportional to the product of the output of said converter and the simulated altitude of said simulated airplane to generate a new signal proportional to vertical deflection, means coupling said new signal to the vertical control circuits of said cathode ray tube to position said cathode beam vertically, an unblanking circuit connected to control said cathode beam, means for introducing additional factors to the output of said converter for generating an unblanking signal for operation of said unblanking circuit to provide the desired visual display.

7. A visual display system for simulating the appearance of an airfield comprising a cathode ray tube including separate horizontal and vertical control circuits to position a cathode beam, an electronic binary counter having a plurality of output terminals, an electronic clock for generating a sawtooth wave and a train of pulses, means connecting said sawtooth wave to said horizontal control circuits to provide for the horizontal sweep of the cathode beam, means coupling said train of pulses to said electronic binary counter, a plurality of "and" gates, said electronic binary counter providing a plurality of digital outputs over parallel lines from said plurality of output terminals to said "and" gates, a digital to analog converter including a plurality of resistors connectable by electronic switches in an amplifier feedback circuit to vary the gain of the converter, means connecting said "and" gates to said electronic switches to vary said gain and control the output of said converter, means for introducing a new signal representing the effects of pitch attitude on the simulated airplane, means coupling said new signal to the vertical control circuits of said cathode ray tube to modify the position of said cathode beam vertically, an unblanking circuit connected to control said cathode beam, and means for introducing additional factors to the output of said converter for generating an unblanking signal for operation of said unblanking circuit to provide the desired visual display.

8. A visual display system for simulating the appearance of an airfield at night comprising a cathode ray tube including separate horizontal and vertical control circuits, an electronic binary counter having a plurality of output terminals, an electronic clock for generating a sawtooth wave and a train of pulses, means connecting said sawtooth wave to said horizontal control circuits to provide for horizontal sweep, means coupling said train of pulses to said electronic binary counter, a plurality of "and"

gates, said electronic binary counter providing a plurality of digital outputs over parallel lines to said "and" gates, a digital to analog converter including a plurality of resistors connectable by electronic switches in an amplifier feedback circuit to vary the gain of the converter, means connecting said "and" gates to said electronic switches to vary said gain and control the output of said converter, means for multiplying the output of said converter to compensate for the altitude of a simulated airplane and to generate a new signal proportional to vertical deflection, means coupling said new signal to the vertical control circuits of said cathode ray tube to position said cathode beam vertically, an unblanking circuit connected to control said cathode beam, means for introducing additional factors to the output of said converter for generating a suitable unblanking signal for operation of said unblanking circuit to provide the desired visual display.

9. Apparatus for generating a display simulating a pattern of airfield lights as viewed in the dark from a simulated aircraft, comprising in combination: a cathode ray tube having a screen, an electron beam, and first and second deflection means operable to position said beam on said screen in first and second mutually perpendicular directions; timing means for deriving a first sweep potential, said first sweep potential being connected to said first deflection means to cause said beam to sweep cyclically across said screen in said first direction; a cyclic electronic counter synchronized with said timing means and operative to provide a plurality of counter output signals; an electronic dividing circuit including an amplifier having first and second feedback circuits; means for applying an input signal to said amplifier; means for varying the impedance of said first feedback circuit in accordance with the simulated distance of said simulated aircraft from said pattern of lights; first electronic switching means for varying the impedance of said second feedback circuit in a series of discrete steps, said first electronic switching means being connected to be operated by said plurality of counter output signals; means for varying the output signal of said amplifier in accordance with simulated altitude of said simulated aircraft to provide a third potential; means connecting said third potential to said second deflection means of said cathode ray tube; and second electronic switching means resposive to said first sweep potential and said amplifier output potential and operative to unblank said beam of said cathode ray tube.

10. Apparatus according to claim 9 having means for deriving a further potential commensurate with pitch angle of said simulated aircraft; and means for applying said further potential to said second deflection means.

11. Apparatus according to claim 9 having means for varying said amplifier output potential in accordance with lateral displacement of said simulated aircraft with respect to said pattern to provide further potentials, means for deriving a fourth potential commensurate with simulated heading of said simulated aircraft with respect to said pattern of airfield lights, said further potentials and said fourth potential being connected to control said second electronic switching means.

12. Apparatus according to claim 9 having means connected to vary the operation of said first and second deflection means in accordance with the instantaneous simulated bank angle of said simulated aircraft.

References Cited in the file of this patent

UNITED STATES PATENTS

| | | |
|---|---|---|
| 2,754,493 | Lippel | July 10, 1956 |
| 2,771,593 | Straehl | Nov. 20, 1956 |
| 2,832,953 | Tasker et al. | Apr. 29, 1958 |
| 2,859,538 | Cutler | Nov. 11, 1958 |
| 2,889,636 | Van Alstyne et al. | June 9, 1959 |
| 2,902,670 | Cutler | Sept. 1, 1959 |
| 2,916,736 | Van Alstyne et al. | Dec. 8, 1959 |
| 2,988,821 | Bolie | June 20, 1961 |

FOREIGN PATENTS

| | | |
|---|---|---|
| 767,489 | Great Britain | Feb. 6, 1957 |